June 24, 1930.  F. A. REID  1,768,000
WINDBREAK
Filed June 2, 1927
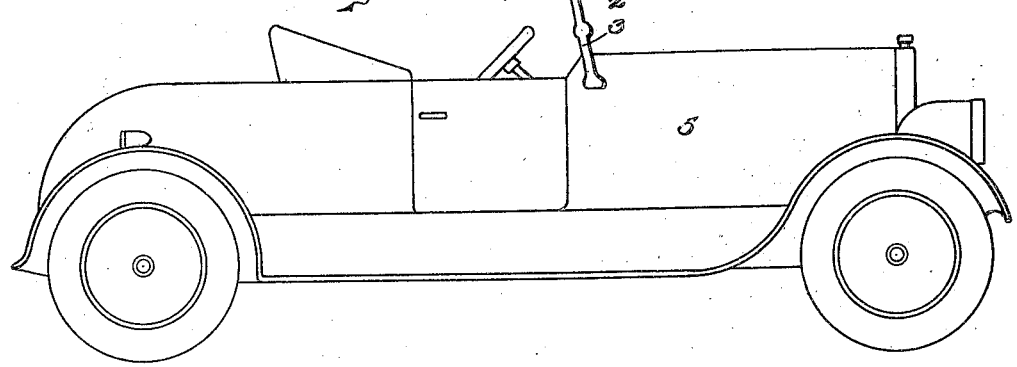
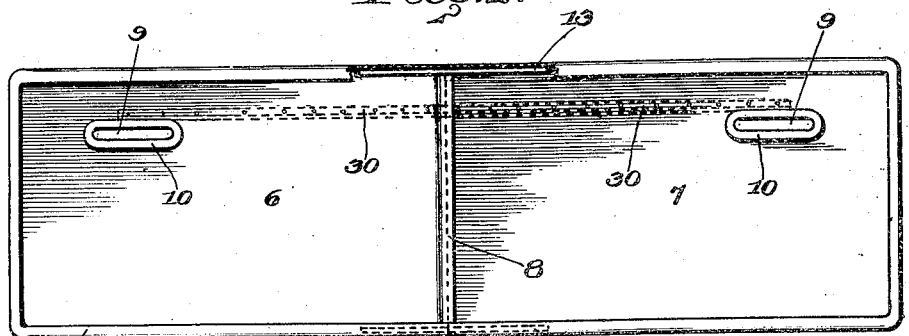
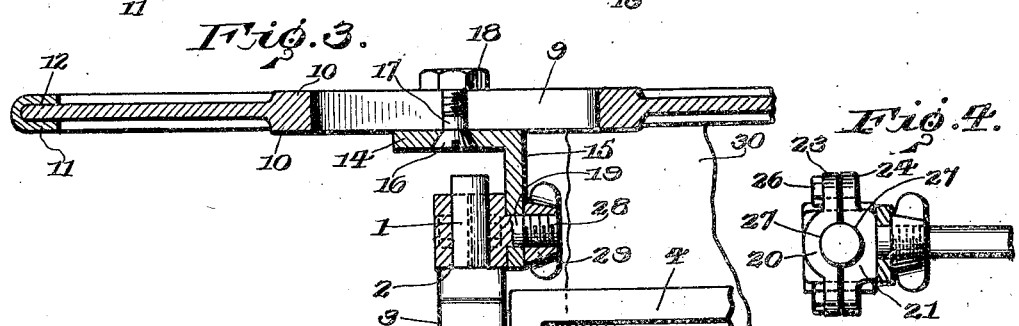
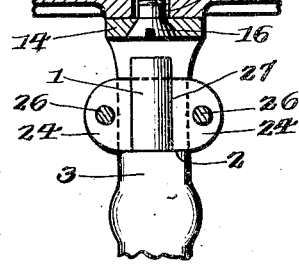
INVENTOR.
F. A. Reid,
BY Geo. F. Kimmel
ATTORNEY.

Patented June 24, 1930

1,768,000

UNITED STATES PATENT OFFICE

FRANCIS A. REID, OF PHOENIX, ARIZONA

WINDBREAK

Application filed June 2, 1927. Serial No. 196,055.

This invention relates to a windbreak for automobiles and has for its object to provide, in a manner as hereinafter set forth, a device of such class for detachable connection to the windshield posts of an automobile, when the top of the latter is down, for deflecting the wind during the travel of the vehicle to prevent discomfiture and annoyance to the occupants thereof, especially when driving.

Further objects of the invention are to provide, in a manner as hereinafter set forth, a windbreak for automobiles which is simple in its construction and arrangement, strong, durable, conveniently connected with and removed from the windshield posts of the automobile, adjustable, thoroughly efficient in its use, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be restorted to which fall within the scope of the claims hereunto appended.

In the drawings wherein like reference characters denote corresponding parts throughout the several views:

Figure 1 is a side elevation of an automobile showing the adaptation with the windshield posts thereof of a windbreak in accordance with this invention.

Figure 2 is a plan, partly broken away, of a windbreak in accordance with this invention.

Figure 3 is a fragmentary view, in lengthwise section, of the windbreak showing the adaptation thereof in connection with one of the windshield posts of the automobile.

Figure 4 is a detail in sectional plan of a clamp for connecting the body of the windbreak to a windshield port.

Figure 5 is a fragmentary view in longitudinal section of the windbreak further illustrating the same positioned with respect to a windshield post.

As is well known the windshield posts or the side members of a windshield frame, each has a reduced upper terminal portion which is indicated at 1, thereby providing a shoulder 2. The windshield posts are indicated at 3 and the shield at 4. The posts 3 are carried by the automobile body 5 forwardly of the driver. The windbreak, in accordance with this invention, is adapted to be detachably connected to the reduced terminal portions 1 of the posts 3. The windbreak is of rectangular contour and is disposed in a horizontal position transversely with respect to the vehicle and further is of a length to project laterally from each of the posts 3. The windbreak is connected to the posts 3 in a manner whereby it can be angularly adjusted relative to said posts. When the windbreak is mounted in position it extends rearwardly from the posts 3, as shown in Figure 1.

The windbreak comprises a body portion formed of a pair of detachably connected sections 6, 7 preferably of rectangular contour and of a length, when connected together and mounted in position, to project laterally from each of the windshield posts 3. Each section of the body portion is constructed of any suitable material, preferably sheet metal of the desired gauge and with the section 6 of greater length than the section 7 whereby the latter will be overlapped by the former when the two sections are connected together to provide the body portion. The overlapping of the section 7 by the section 6 is indicated at 8 Figure 2. Each section of the body portion between its transverse median and its forward side edge is provided with a lengthwise extending oval-shaped slot 9 positioned between the transverse median and the outer end edge of the section. The material forming each of the sections is reinforced on its upper and lower faces, as indicated at 10 and such reinforcements surround the opening or slot 9. That part of the section 6 which overlaps the section 7, and which is indicated at 8, is of less length than the width of either of the sections and said portion 8 has one end thereof positioned adjacent one side edge of the section 6 and its other end edge positioned adjacent the other side edge of the section 6. The portion 8 is offset relative to the remaining part of the section 6 so that it will overlap the section 7.

Each section is surrounded by a frame 11 which is open at its inner end. The body of the frame 11 is of U-shaped cross section as indicated at 12 Figure 3 for the purpose of receiving its respective section. When the sections 6 and 7 are detachably connected together the inner ends of the frame 11 of the section 6 abut against the inner ends of the frame 11 of the section 7, see Figure 2.

The sections 6 and 7 are detachably connected together, in abutting relation, by a pair of coupling pins 13, which are fixedly secured to the section 7, at the inner part thereof and engage in the inner portion of the frame 11 for the section 6, see Figure 2. The coupling pins or members 13 are secured to one face of the section 7 at the inner ends of the side marginal portions thereof.

The body portion is detachably connected to the posts 3, by a pair of coupling members and a pair of clamp devices which are connected to the coupling members. A coupling member is associated with each section of the body portion and each coupling member consists of a pair of arms 14, 15, disposed at right angles with respect to each other. The arm 15 is of greater length than the arm 14 and the latter is provided with a counterbored opening 16, in which is countersunk the head of a connecting screw 17, which extends through a slot and carries on its upper end a securing nut 18. The arm 15 at a point between its transverse median and its free end is formed with an opening 19 for a purpose to be presently referred to. When the coupling members are arranged in position, the arms 14 bear against the enlargements 10 on the lower face of the sections 6, 7.

Each clamping device is formed of a pair of sections 20, 21. The sections 20, 21 are provided with oppositely extending opposed flanges 23, 24 respectively with which associate securing bolts 26. Each section has its inner face formed with a semi-circular groove 27 for the reception of the reduced terminal portion 1 of a windshield post 3. The sections 20 are positioned on the inner side of the reduced terminal 1 of the post 3 and the sections 21 on the outer side. Each section 21 has its outer face, centrally thereof, provided with a tubular peripherally threaded arm 28 which extends through an opening 19 and projects a substantial distance from the arm 15 in which the opening 19 is formed. Threadably engaging with the arm 28 is a clamping nut 29 of the wing type and which provides means for clamping the arm 15 against a section 21. The arms 15 are angularly adjustable on the arms or lugs 28.

Secured to the lower face of each of the sections 6, 7, is a leather flap 30, to cover opening between the windbreak and windshield when the former is in the position shown in Figures 1 and 3.

The attachment not only provides means for deflecting the wind, but also acts as a sunshade.

When it is not desired to use the windbreak, the sections 6, 7 can be disconnected and the body portion conveniently stored in the automobile.

The windbreak, when attached to the windshield posts or side arms 3 will deflect the wind away from the occupants of the vehicle thereby overcoming any discomfiture from the wind to the occupants when driving, and owing to the fact that the windbreak can be conveniently secured and removed in and from active position when it is desired, it is thought the many advantages of a windbreak can be readily understood, although the preferred embodiment of the invention is as illustrated and described, yet it is to be understood that changes in the details of construction can be had which will fall within the scope of the invention as claimed.

What I claim is:

1. A windbreak for motor vehicles comprising a pair of spaced clamping devices for connection to the supporting means for a windshield above the top of the latter and each including a lateral pivot, a rectangular deflector of a length to project laterally in both directions with respect to the windshield and having a pair of spaced, endwise aligning slots disposed lengthwise and adjacent the ends thereof, a pair of spaced, angularly adjustable coupling members mounted on said pivots and each formed of a pair of arms disposed at right angles to each other, means extending through said slots for adjustably connecting said deflector intermediate its ends to one of the arms of each of said members, said connected arms disposed lengthwise with respect to and abutting throughout their length said deflector for supporting it between its side edges, and said devices including means for securing them to said supporting means and for clamping the other arms of said members thereto to retain the latter in adjusted position.

2. A windbreak for automobiles comprising a pair of spaced clamping devices for connection to the supporting means for a windshield above the top of the latter and each including a lateral pivot, a deflector having a pair of spaced, endwise aligning slots disposed lengthwise of and adjacent the ends thereof, a pair of spaced, angularly adjustable coupling members mounted on said pivots and including inwardly extending deflector supporting arms apertured intermediate their ends, means extending through said arms and slots for adjustably connecting said deflector, intermediate its ends to said members, said members supporting said deflector lengthwise thereof between its sides, and said devices including means mounted on said lateral pivots for clamping said members to the devices to retain the latter in adjusted position.

In testimony whereof, I affix my signature hereto.

FRANCIS A. REID.